United States Patent
Caumont et al.

(10) Patent No.: US 7,911,766 B2
(45) Date of Patent: Mar. 22, 2011

(54) SUPERCAPACITOR COVER WITH INTEGRATED CENTER TERMINAL

(75) Inventors: Olivier Caumont, Quimper (FR); Xavier Hascoet, Plomodiern (FR)

(73) Assignee: Batscap, Ergue Gaberic (FR)

( * ) Notice: Subject to any disclaimer, the term of this patent is extended or adjusted under 35 U.S.C. 154(b) by 733 days.

(21) Appl. No.: 11/628,788

(22) PCT Filed: Jun. 9, 2005

(86) PCT No.: PCT/FR2005/001425
§ 371 (c)(1),
(2), (4) Date: Jan. 16, 2008

(87) PCT Pub. No.: WO2006/000705
PCT Pub. Date: Jan. 5, 2006

(65) Prior Publication Data
US 2008/0285207 A1    Nov. 20, 2008

(30) Foreign Application Priority Data

Jun. 11, 2004   (FR) ..................................... 04 06326

(51) Int. Cl.
*H01G 9/00* (2006.01)
(52) U.S. Cl. ........ 361/502; 361/503; 361/504; 361/509; 361/512; 361/523
(58) Field of Classification Search ................... 361/502, 361/503–504, 509–512, 516–519, 523–525, 361/528–530, 540–541
See application file for complete search history.

(56) References Cited

U.S. PATENT DOCUMENTS

| | | | | |
|---|---|---|---|---|
| 4,447,854 A * | 5/1984 | Markarian | ..................... | 361/329 |
| 4,813,116 A * | 3/1989 | Thiel et al. | ..................... | 29/25.42 |
| 5,198,313 A | 3/1993 | Juergens | | |
| 6,262,876 B1 * | 7/2001 | Schimanek | ................. | 361/301.5 |
| 6,845,551 B2 * | 1/2005 | Mandelcorn et al. | ........ | 29/25.42 |
| 7,248,460 B2 * | 7/2007 | Omura et al. | .................. | 361/502 |
| 7,274,551 B1 * | 9/2007 | Parler et al. | .................... | 361/518 |
| 7,286,335 B2 * | 10/2007 | Hozumi et al. | ............... | 361/502 |
| 7,457,102 B2 * | 11/2008 | Miura et al. | ................... | 361/519 |

FOREIGN PATENT DOCUMENTS

| | | |
|---|---|---|
| DE | 32 26 406 | 1/1984 |
| FR | 2 583 213 | 12/1986 |
| FR | 2 771 218 | 5/1999 |
| JP | 9-92338 | 4/1997 |

* cited by examiner

*Primary Examiner* — Nguyen T Ha
(74) *Attorney, Agent, or Firm* — Blakely, Sokoloff, Taylor & Zafman LLP

(57) ABSTRACT

An electric energy storage component having coil windings and at least one connector. A plate of the connector is in contact with the coil windings. The plate of the connector has a surface which is provided with a terminal wherein the shape thereof is essentially that of a revolution. The plate also forms a series of bosses extending in a raised manner along a surface of the plate opposite to that containing the terminal. The terminal has at least one inner recess and at least one boss which penetrates into the recess.

15 Claims, 5 Drawing Sheets

SUPERCAPACITOR COVER WITH INTEGRATED CENTER TERMINAL The present patent application is a non-provisional application of International Application No. PCT/FR2005/001425, filed Jun. 9, 2005.

BACKGROUND OF THE INVENTION

1. Field of the Invention

The invention relates to electrical connection and external casing arrangements for electric energy storage components (batteries, capacitors, for example capacitors of the electrochemical type) and notably for supercapacitors.

2. Description of Related Art

An electric energy storage component, notably a supercapacitor, appears as a winding of several material layers with, jutting out from each end of the winding, a sheet based on aluminium, called a collector, and which enables the current to be drained outwards. This collector should be electrically connected to an electric connection terminal which is part of the global supercapacitor casing, either in its cover, or in its case.

Welding the collector onto the connector of the terminal by a weld is known, possibly by a laser weld on the bottom of bosses made in the connector.

But a supercapacitor generates strong charge or discharge currents on the sections of this collector which is relatively soft, because it is relatively thin, so that a maximum of (surface) sections have to be connected to the terminal or to the cover or to the case, in order to limit the resulting electric connection resistance and therefore heat build-up, notably at the interface between the sections of the collector and the connector.

For reasons of performances, but also for the simplicity of application, and reasons of cost, the terminal should ideally be an integral part of the cover or case to which the collector is connected electrically, and not added to the latter by another process step.

The terminal is not part of the cover in the existing solutions (commercial products).

Moreover, it is difficult to reconcile on a same part (cover, case), a current-collecting central terminal as wide as possible, and a weld in bosses attaining the turns of the centre of the winding, as much as possible.

Indeed, a central terminal should be as superficial as possible (sufficient sectional area for collecting current and letting it flow through) and it therefore occupies a certain surface area at the centre of the cover which may limit accessibility to the bosses and prevent laser shots from reaching the turns of the centre.

In the prior art, the terminal is, for this reason, often treated separately and added to the cover or to the bottom of the case, which allows both aspects to be reconciled.

But this requires that they be subsequently connected in order to provide the whole of the required functions. From an electrical point of view, this connection generates an additional series resistance detrimental to the properties of the supercapacitor, a process step and therefore a cost, and also additional mechanical brittleness.

The terminals added to the cover or the case by a laser weld, are thus found to have brittleness of the connection between both parts. Jamming two cones with each other for attaching the terminal is of course suggested, but such jamming increases heat build-ups by the surface contact resistance at the interface between both mutually jammed parts. Moreover, fitting of the parts should then be perfect, which generates significant machining costs.

BRIEF SUMMARY OF THE INVENTION

The object of the invention is to facilitate contact of the connector with the sections of the innermost turns of an electric storage component winding, while providing sufficient space for a central terminal with a substantially circular contour, notably made in the same material as the connector.

This object is achieved according to the invention by means of an electric energy storage component including a winding of turns, and at least one connector including a plate in contact with a plurality of these turns, the connector plate having a face provided with a terminal of a substantially axisymmetric shape, the plate further forming a series of bosses which extend in a raised manner along a face of the plate opposite to that bearing the terminal, characterized in that the terminal has at least one inner recess and in that at least one boss penetrates into such a recess.

BRIEF DESCRIPTION OF THE DRAWINGS

Other features, objects and advantages of the invention will become apparent upon reading the detailed description which will follow, made with reference to the appended figures wherein.

DETAILED DESCRIPTION OF THE INVENTION

Figure 1:
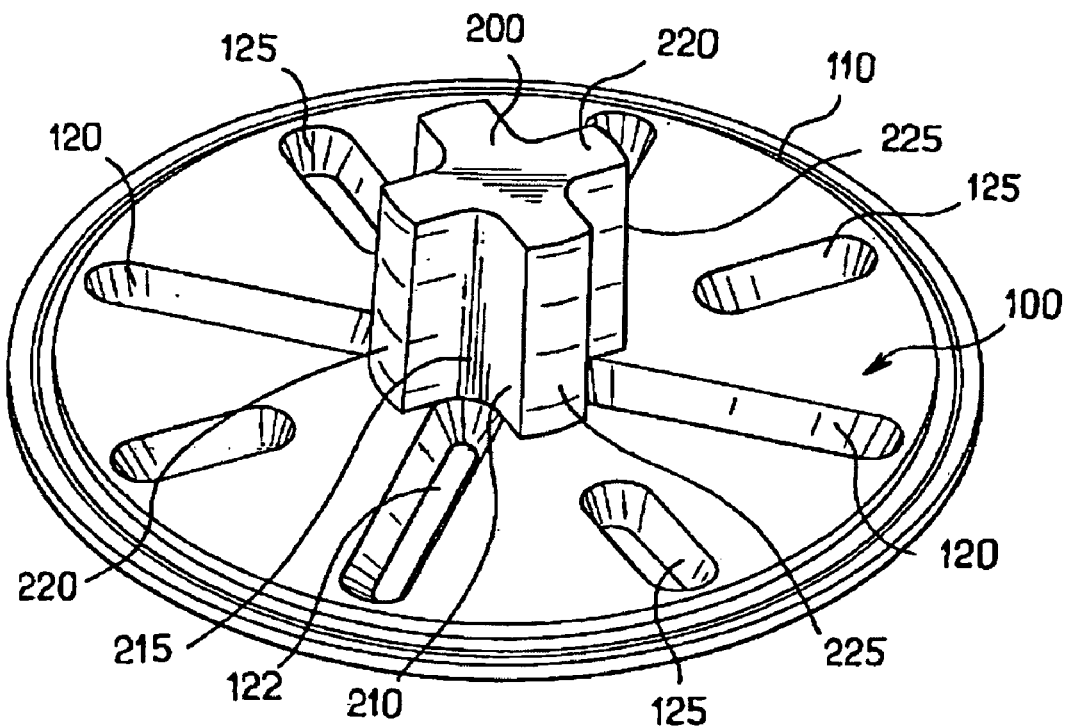
FIG. 1 is a perspective view of a connector according to a first embodiment of the invention.
Figure 2:
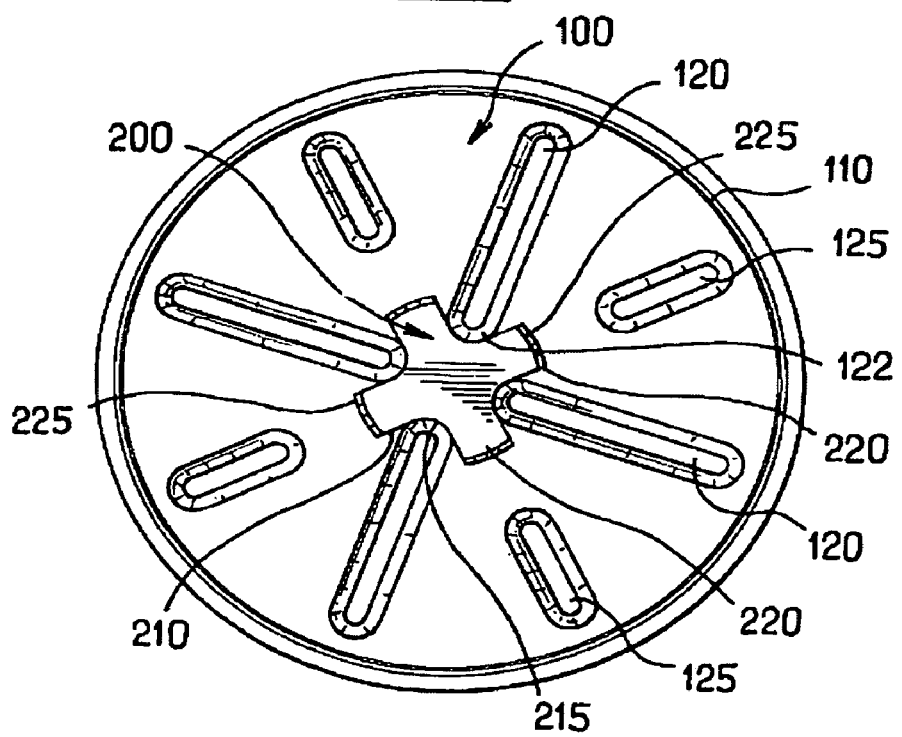
FIG. 2 is a top view of this same connector.
Figure 3:
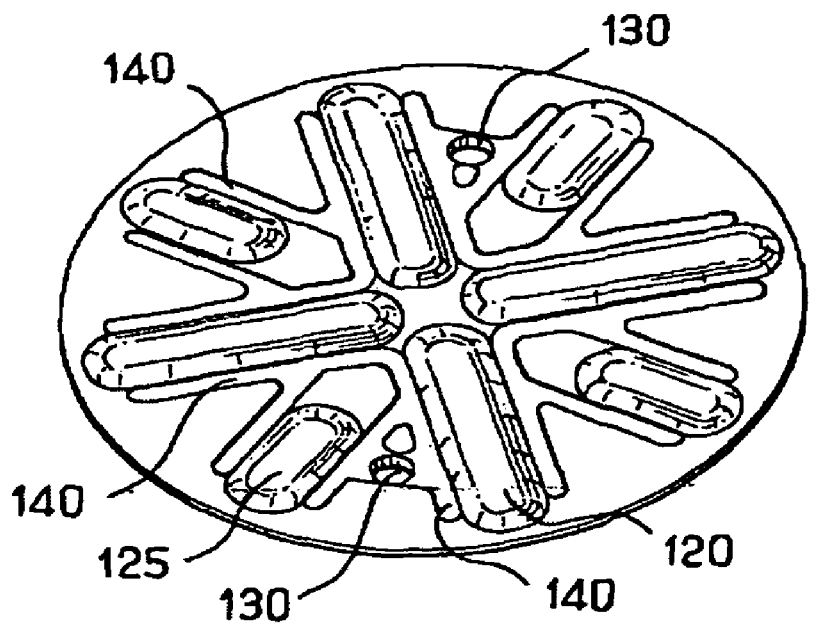
FIG. 3 is a perspective and underside view of this same connector.

The connector of FIG. 1 is a one-piece part, here in aluminium, including both a plate 100 intended for covering and contacting turns of a supercapacitor winding, and an upper trunnion 200 rising in the central portion of this plate in order to form the outer connection terminal of a supercapacitor.

The cover plate is a disk with a contour substantially matching that of the winding to be covered, this contour being provided here with a groove 110 intended for receiving a gasket for sealing the supercapacitor.

This plate has a series of deformations or bosses 120, 125 which rise and form a relief on a lower face of the plate 100, i.e., on the face opposite to the one where the external connection terminal 200 rises.

These bosses have a small height relatively to that of the terminal 200 but most of them have sufficient extent in order to radially cross a majority of the turns of the winding.

In order to contact a maximum of these sections, the bosses 120, 125 each extend transversely to these sections, i.e., every time along a radius of the connector.

Certain bosses 120 extend over a majority of the length of the relevant radius. These bosses 120 with maximum radial extent are here four in number, and are placed at 90° relatively to each other around the terminal 200. These long bosses 120 will be designated subsequently as <<main bosses>> because of their electric function consisting of collecting a maximum of the amount of current available upon contacting the turns of the winding.

Four other bosses 125, called <<complementary bosses>> 125 hereafter, although they are also oriented radially, are limited in their extent upon crossing a peripheral edge area of the plate 100 in order to collect the current from the winding only on this peripheral edge area.

By this function consisting of collecting the current only on the peripheral edge, these complementary bosses 125 balance the electric flux in the collector, for better efficiency in the role of the collector and for reducing its global electric resistance.

The ratio of the length between the complementary bosses 125 and the main bosses 120 is advantageously selected in order to distribute at best the current in the coil and thereby balance the heat build-up areas.

The complementary bosses 125 may be welded for applications with a strong average current (for example cycling applications in hybrid or electric transportation) and may not be welded for applications with a weak average current (for example in so-called floating applications or uninterrupted power supplies.

The cover comprising this connector may include several main 120 and complementary 125 bosses per angle of 90° in order to increase the weld section with the coil.

The terminal 200 described here, therefore belongs to the family of terminals which have substantially an axisymmetric shape, i.e., an outer contour at least partly inscribed on a circle.

It will be noted that a delimitation circle may be constant over the height of the terminal or increasing towards the base of this terminal which gives the latter a shape which is at least partly frustro-conical, according to the arrangements specified hereafter.

The substantially axisymmetric shape is suitable for receiving a lug of the clamping collar type, typically associated with such a terminal.

With a substantially axisymmetric shape, it is also possible to obtain an upper surface adapted so as to cooperate with a planar lug, for example itself attached by means of peripheral clamping.

The axisymmetric shape, even if it is only partial, is also advantageous because it is well suited for bearing an outer thread for attaching a lug of the <<screw-in>> type.

It is then also possible to screw a nut thereon in order to tighten a flat lug against the surface of the cover plate of the collector.

Such a terminal 200 may also have an inner tapped thread for fitting or screwing a male connector.

The terminal 200 shown here is however provided with four recesses 210, distributed at 90° from each other and each extending over the whole height of the terminal 200.

Consequently, the terminal 200 as viewed from above has the shape of a cross with orthogonal branches 220.

The recesses 210 each have a bottom wall 215 with a curved shape, i.e., as an arc of circle when viewed from above, if they are made by a stamping-extrusion process.

More specifically, each recess bottom wall 215 is configured as a frustrum so that the recess widens from the bottom to the top. Conversely, each branch, delimited by two recesses, widens upon travelling down the latter from top to bottom (from its end to its base).

The main bosses 120 will each extend up to the very contact of the bottom wall of an associated recess 210.

The main bosses 120 themselves have sloped side walls 122 and this notably at their inner end at the terminal 200, these side walls forming a clearance surface during the cover manufacturing process.

Each main boss inner end wall will consequently lie directly in the extension of the bottom wall 215 of the relevant recess 210.

The complementary bosses 125 as for them break off more or less significantly at a distance from the periphery of the terminal 200.

The walls of the terminal which are the closest to the complementary bosses 125, i.e., the ends 225 of the branches 220 of the terminal 220, are themselves frustro-conical.

With the recesses 210, a terminal with a large radius may be made simultaneously with long range bosses towards the centre of the cover.

These arrangements further allow extended welding of the cover on the innermost windings.

Such a welding is carried out at the bottom walls of the bosses 120, 125 which are in contact with the turns of the windings. Among the possible welding techniques, welding with laser shots on the bottom of the bosses is what gives the best results.

Thus, with the cover described here, the boss may be welded on the winding as well as in the most central portions of the collector, i.e., actually inside the circular contour delimiting the terminal.

Figure 4:
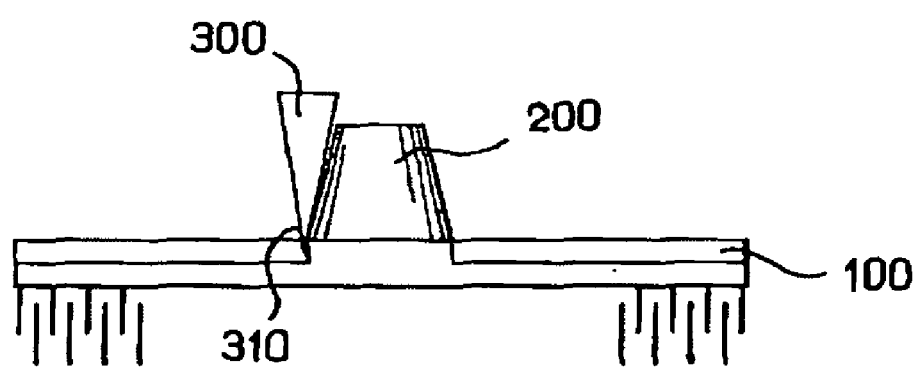
FIG. 4 illustrates a first method for welding this connector on a storage winding.

A laser beam 300 (FIG. 4) is typically point-like at its tip, while however exhibiting a certain width along a portion of its travel.

In order that the tip of the beam 300 may penetrate into the recesses of the terminal without the beam being interrupted in its travel portion, the inner frustro-conical walls 215 of the recesses 210 are sufficiently sloped in order to receive the whole laser beam 300.

Figure 5:
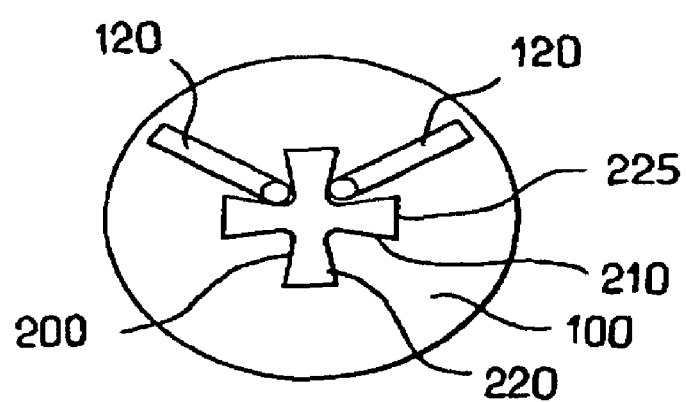
FIG. 5 is a top view of this first method for welding this connector.

Alternatively, recesses 210 are provided, the contour 215 of which is sufficiently wide for including the laser beam 300 in its widest portion, i.e., at the upper limit of the terminal 200 (FIG. 5).

Figure 6:
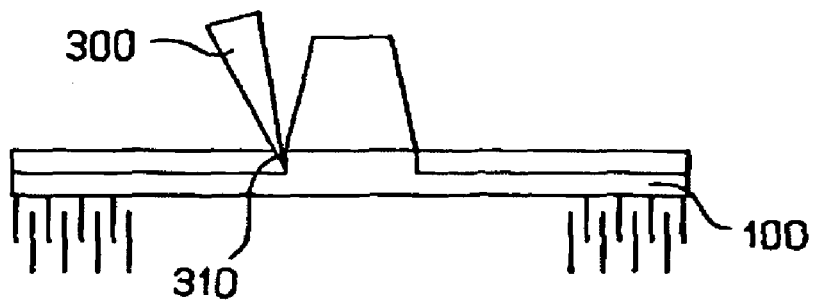
FIG. 6 illustrates a second method for welding this connector.

Another embodiment (FIG. 6) consists of slightly tilting the laser beam 300 so that its conical shape only approaches the terminal 200 at its tip 310.

In spite of the truncation of the terminal 200, the contact surface remains amply satisfactory here with a surface area of the order of 365 mm$^2$ (for an initial terminal with a base diameter of 18 mm, a top diameter of 17 mm, and with a height of 20 mm, and ⅔ truncated) allowing a nominal DC current of about 900 A without excessive heating.

As a comparison, an equivalent solid frustro-conical terminal has a contact surface of 1,100 mm$^2$, i.e., a nominal DC current of 2,750 A in an aluminium type material (2.5 A/mm$^2$ without excessive heating.

The fact of only having here a single part including plate, bosses and terminal, produced from a same block of material and which provides both inner and outer connection functions, simplifies the assembling and reduces the cost of the complete component.

Figure 7:
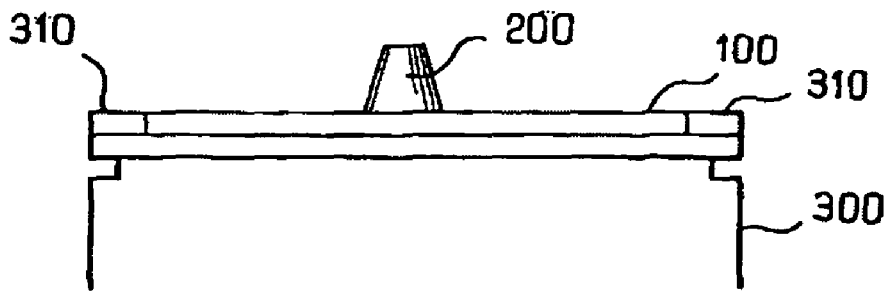
FIG. 7 is a side view illustrating a method for attaching such a connector on a supercapacitor case component.

The present cover is sealed at its periphery by means of seal gasket onto which the edge 410 of the case 400 (FIG. 7) is folded. As discussed earlier, this collector has a projecting edge 110 for blocking such a gasket during the closing operation.

This cover may include any other type of edge capable of being used for closing the component (crimping, welding, etc.).

The connector has two excentered holes 130 for letting through an electrolyte after this closing operation so as to allow impregnation of the winding of the supercapacitor by the electrolyte after closing the casing (case, or tube+covers (s)). Both holes 130 are then hermetically blocked, by any known means.

This connector is also provided on its inner face, with a network of grooves 140 which form a space for the flow of electrolyte between the winding and the connector, in order to assist impregnation.

Figure 8:
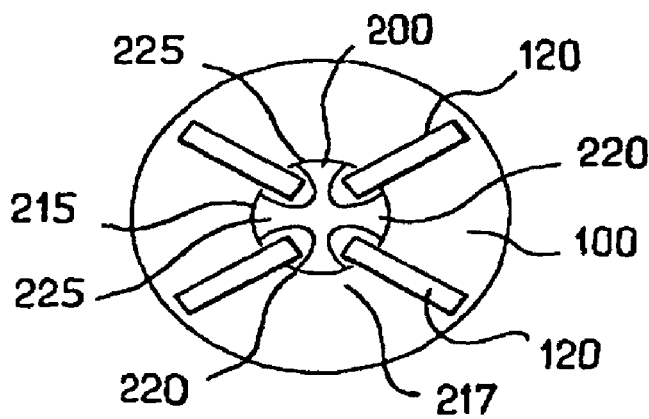
FIG. 8 is a top view of a connector according a second embodiment of the invention.

In the alternative of FIG. 8, a central terminal 200 is proposed, with an essentially axisymmetric shape, and even, more specifically, externally frustro-conical and the base of which, with a substantially circular contour, is recessed so that the main bosses 120 may penetrate as close as possible to the centre of the turns, inside the terminal.

Figure 9:
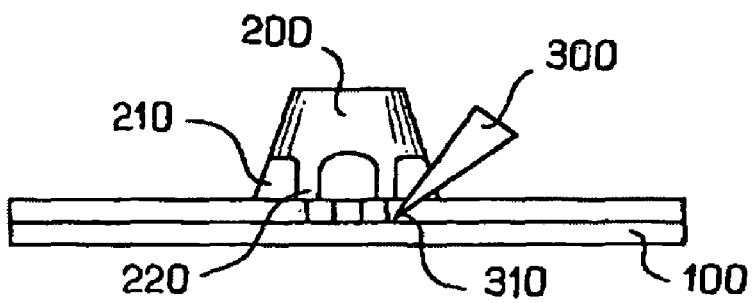
FIG. 9 is a side view of this same connector.

In this alternative, laser shooting is advantageously carried out at an angle in order to reach the end of the bosses 120 (FIG. 9).

Advantageously, the recesses 210 here have an inner wall 215 with a section, considered parallel to the covering plate, with an oval shape. By this oval shape, the side walls of each recess 210 will laterally come closer to the boss 120 so as to edge it very close here, in a substantially parallel way.

Consequently, the terminal 200 forms branches 220 which each tend to widen when running outwards.

Thus, the terminal when it is observed as a section parallel to the covering plate 100, has in a planar section the shape of a cross, a so-called "cross patee" (in heraldry), the branches of which 220 widen and are curved at a distance from the centre in order to form at their end 225, a widening with pointed edges 216 and 215.

In other words, each branch has two opposite side tips 216 and 217 which separate from each other, the ends of the branches however remaining inscribed on a circle.

This shape gives the terminal 200 a wide peripheral section formed by the widened ends of each of the branches 220, while it also allows marked penetration of each boss 120 within the axisymmetric shape.

There again, this terminal 200 is frustro-conical, the recesses 210 being provided here only on the half of the height of this terminal, i.e., on the half adjacent to the covering plate 160.

In this embodiment, the terminal is also in a single piece with the covering plate, as a single aluminium part.

There again, a peripheral surface and a section of large surface area may be obtained with the recesses 210 provided in this terminal 200.

Figure 10:
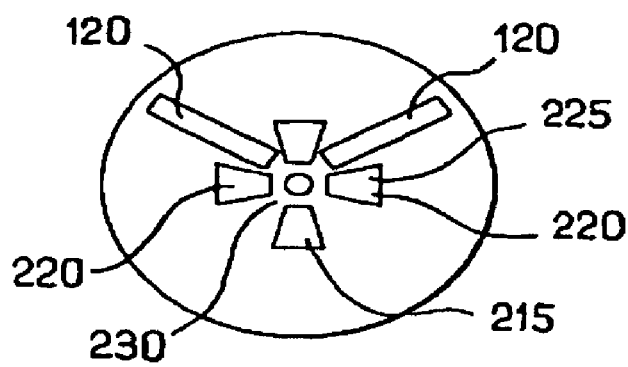
FIG. 10 is a top view of a connector according to a third embodiment of the invention.

In the alternative illustrated in FIG. 10, the terminal 200, instead of being solid in its central portion, there consists exclusively of four branches 220, not connected to each other, except by the covering plate 100 of the collector.

The contact surface between a lug with an upper contact and the terminal 200 is certainly reduced, but remains sufficient in this alternative as well.

With the recess at the centre 230, the bosses 120 may come closer together, even closer to the centre, or even be continuous upon crossing the plate 100.

Moreover, with this alternative, an impregnation port 130 may be inserted at the very centre of the plate 100.

Here also, the branches 220 have an end surface with a frustro-conical shape in order to promote connections by a lug with peripheral clamping.

Also in this case, the branches 220 have a width which increases when running along a branch from the inside to the outside of the terminal, with substantially rectilinear branch edges when observed in a section parallel to the plate.

In order to guarantee the connection, it is advantageous to insert a central spacer at the centre of the branches 220 in order to strengthen the whole under the effect of the peripheral clamping.

The number of branches 220 may be different, for example three (spaced out by 120°), for gaining space, material and simplicity in the making. The number of branches may also be X, with X larger than 4, with a spacing of (360/X°).

It is also possible to make branches which are not spaced out regularly, even if this tends to "de-homogenize" the flow of the current in the coil and therefore unbalance the component as regards heat build-up and ageing.

Figure 11:
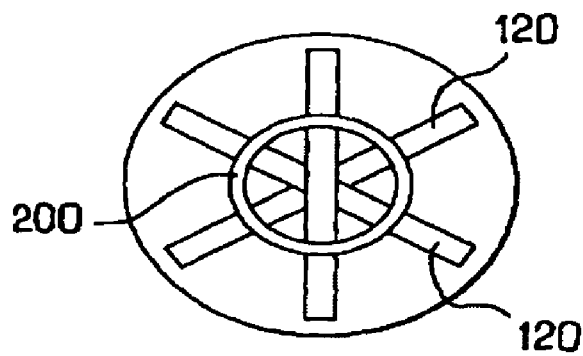
FIG. 11 is a top view of a connector according to a fourth embodiment of the invention.
Figure 12:
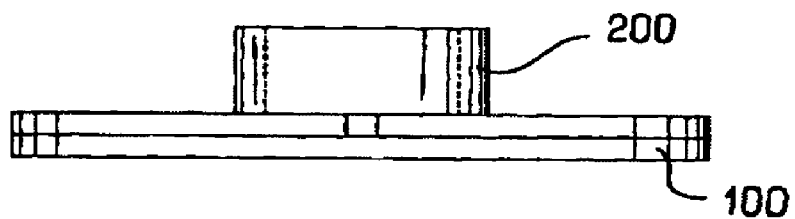
FIG. 12 is a side view of this same connector.

In the alternative of FIGS. 11 and 12, a ring-shaped terminal 200 is proposed, i.e., having the shape of a concentric cylinder with the tubular cover, this cylinder advantageously has recesses at its base to let the bosses pass through to the interior of the cylinder.

Its radius is sufficiently large for providing a sufficient contact peripheral surface, and simultaneously, with the space left at the centre, the bosses may attain the most central turns.

An impregnation hole 130 is provided here at the centre of the plate 100 inside the terminal 200.

Figure 13:
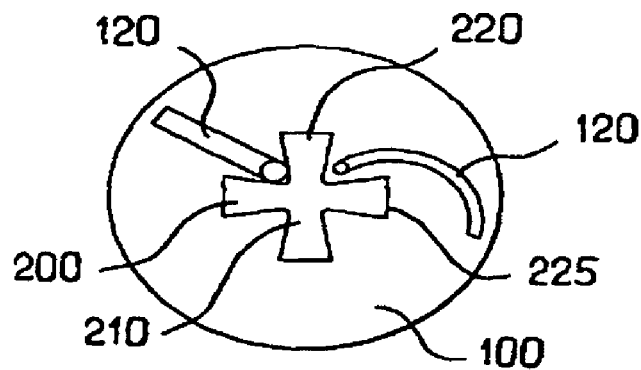
FIG. 13 is a top view of a connector according to a fifth embodiment of the invention.

In the alternative of FIG. 13, benefit is drawn from the fact that the external turns drain more current than the turns of the centre.

Now, for a relevant turn, a weld by a laser shot perpendicular to this turn provides a boss/turn contact surface which is the same whether the turn is external or internal.

Application of a weld which on the contrary generates a contact surface which is much larger for the external turns than for the internal turns, is desired here.

A means for providing such a result is to form the bottom of the bosses in a conical way, i.e., with a lower contact surface which is wider in the external portion of the collector, in order to have more surface of the collector in contact towards the outside of the latter.

Here, however, in order to increase the welding surface at the external turns, and this with a single laser shot, a spiral boss 120 is adopted which tends to be tangent to the turns outwards. More generally, a boss is achieved, the direction of which gradually deviates from a radial orientation. Thus, the closer the laser ray approaches from the outside, the larger is the welded section of the collector, because crossing between boss and turn is increasingly more tangential.

Figure 14:
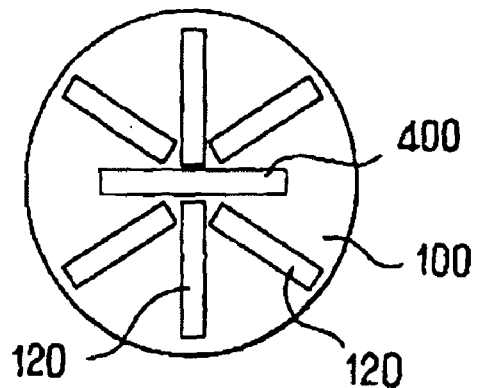
FIG. 14 is a top view of a connector according to a sixth embodiment of the invention.
Figure 15:
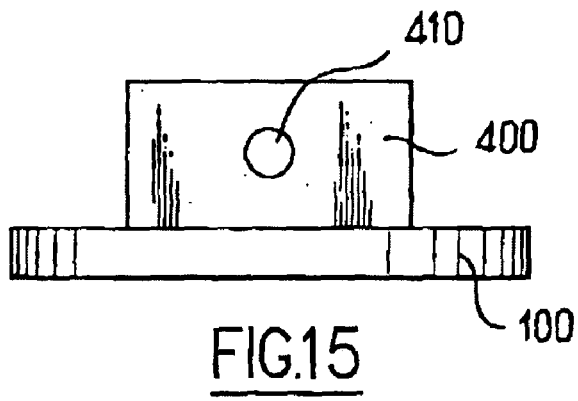
FIG. 15 is a side view of the connector of the sixth embodiment.

In a quite different approach, a terminal with branches, the number of branches of which may be two (spaced by 180°) or even a terminal in the shape of a rectangular parallelepiped 400 (FIGS. 14 and 15) will be mentioned. The latter then extends between bosses of the main type.

This terminal for example includes a port 410 for screwing or is directly welded on a current-collecting bar.

Figure 16:
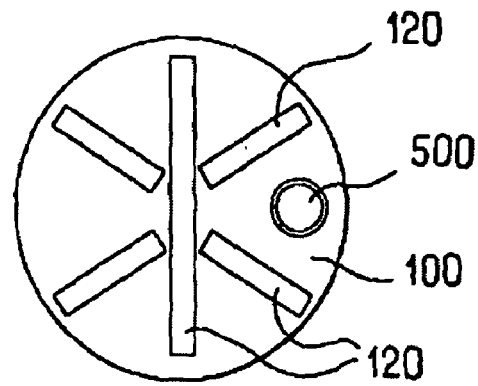
FIG. 16 is a top view of a connector according to a seventh embodiment of the invention.
Figure 17:
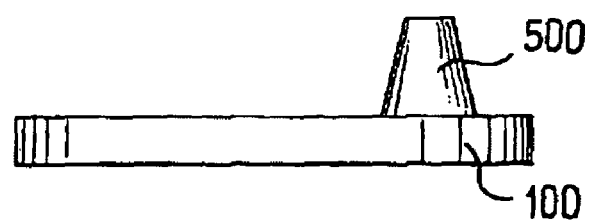
FIG. 17 is a side view of the seventh embodiment.

In order to allow the bosses to access the turns of the centre, while keeping a terminal integrated to the cover, an even different approach is to excenter the terminal in an area located between the bosses (terminal 500 in FIGS. 16 and 17).

This configuration has the disadvantage of unbalancing the current flow in the relevant storage component.

A second excentered terminal of the same type and diametrically opposite to the first, or even several other excentered terminals are advantageously added in order to homogenize the current flow in the collector without paying any penalty for welding all the turns.

The invention claimed is:

1. An electric energy storage component including a winding of turns, and at least one connector substantially perpendicular to the generatrix of the winding, including a plate in contact with a plurality of these turns, the connector plate having a face provided with a terminal of a substantially axisymmetric shape, the plate further forming a series of bosses which extend in a raised manner on a face of the plate opposite to the one bearing the terminal, wherein the terminal has at least one inner recess and in that at least one of said series of bosses penetrates into said at least one recess.

2. The component according to claim 1, characterized in that it comprises a supercapacitor.

3. The component according to claim 1 or claim 2, characterized in that the terminal has an external shape inscribed at least partially on a frustrum.

4. The component according to claim 1, characterized in that it includes at least one bottom surface of a substantially frustro-conical recess, flared towards the free end of the terminal.

5. The component according to claim 1, characterized in that the terminal forms a branch between each pair of recesses and in that each branch ends with a frustro-conical surface which widens towards the base of the terminal.

6. The component according to claim 1, characterized in that the terminal is provided with at least one recess which extends on only one portion of the height of the terminal.

7. The component according to claim 1, characterized in that the terminal forms at least one branch edged by two recesses which extend in width when running in the direction of the periphery of the terminal.

8. The component according to claim 1, characterized in that it has a series of branches which are without any link between them over at least one portion of their height.

9. The component according to claim 1, characterized in that the terminal has branches which extend in width when running towards their end peripheral to the terminal, each branch forming at its end, two tips extending opposite to each other.

10. The component according to claim 1, characterized in that it includes at least one series of recesses each having an ovoid section when considered in a section parallel to the covering plate.

11. The component according to claim 1, characterized in that it has a terminal in the shape of a tubular portion.

12. The component according to claim 1, characterized in that it has at least one curved boss so that this boss extends along a direction which changes by gradually deviating from a radial direction when the boss is running towards the outside of the covering plate.

13. The component according to claim 1, characterized in that the covering plate has a face, opposite to the one bearing the terminal which is provided with channels adapted to the flow of an electrolyte on this face.

14. The component according to claim 1, characterized in that the covering plate has at least one port for feeding electrolyte.

15. The component according claim 1, characterized in that it has several bosses, certain of which have a length less than that of a radius of the covering plate and only extend inside a peripheral area of the covering plate.

\* \* \* \* \*